United States Patent
Davis et al.

(10) Patent No.: US 10,549,512 B2
(45) Date of Patent: Feb. 4, 2020

(54) THINWALL COMPOSITES FOR ELECTRONIC ENCLOSURES AND OTHER DEVICES

(71) Applicant: SABIC Global Technologies B.V., Bergen op Zoom (NL)

(72) Inventors: Scott Michael Davis, Washington, MA (US); Daniel Sowle, Dalton, MA (US); Craig Lawrence Milne, Pittsfield, MA (US); Christopher Wall, Dalton, MA (US); Emile Homsi, Sicklerville, NJ (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 391 days.

(21) Appl. No.: 15/324,436

(22) PCT Filed: Jul. 9, 2015

(86) PCT No.: PCT/IB2015/055211
§ 371 (c)(1),
(2) Date: Jan. 6, 2017

(87) PCT Pub. No.: WO2016/005942
PCT Pub. Date: Jan. 14, 2016

(65) Prior Publication Data
US 2017/0203551 A1    Jul. 20, 2017

Related U.S. Application Data

(60) Provisional application No. 62/022,333, filed on Jul. 9, 2014.

(51) Int. Cl.
*B32B 27/12* (2006.01)
*B29C 45/14* (2006.01)
(Continued)

(52) U.S. Cl.
CPC ........ *B32B 27/12* (2013.01); *B29C 45/14508* (2013.01); *B32B 1/02* (2013.01);
(Continued)

(58) Field of Classification Search
CPC ........ B32B 27/12; B32B 27/08; B32B 27/20; B32B 27/281; B32B 27/286;
(Continued)

(56) References Cited

U.S. PATENT DOCUMENTS 8,372,495 B2   2/2013   Kenney
8,574,696 B2  11/2013   Lev et al.
(Continued)

FOREIGN PATENT DOCUMENTS

CN    202264442    6/2012
EP    0805463 B1   8/2000
(Continued)

OTHER PUBLICATIONS

International Search Report for International Application No. PCT/IB2015/055211; International Filing Date: Jul. 9, 2015; dated Nov. 4, 2015; 5 Pages.
(Continued)

*Primary Examiner* — Michael C Miggins
(74) *Attorney, Agent, or Firm* — Cantor Colburn LLP

(57) ABSTRACT

In an embodiment, an A-B-A structure, can comprise: a core layer comprising a first thermoplastic material having a first density (Y), wherein the core layer has a core thickness and wherein the core layer comprise at least one of (i) a through plane thermal conductivity of greater than equal to 0.1 W/m K, and (ii) a core layer density (X) that is $X \geq 0.8Y$; a first outer layer comprising a second thermoplastic material located on a first side of the core layer; and a second outer layer comprising the second thermoplastic material located on a second side of the core layer opposite the first side;
(Continued)

wherein the core thickness is 30% to 75% of a total thickness of the A-B-A structure.

20 Claims, 8 Drawing Sheets

(51) Int. Cl.
| | |
|---|---|
| *B32B 1/02* | (2006.01) |
| *B32B 5/02* | (2006.01) |
| *B32B 7/02* | (2019.01) |
| *G06F 1/16* | (2006.01) |
| *B29K 69/00* | (2006.01) |
| *B29K 309/08* | (2006.01) |
| *B29L 31/34* | (2006.01) |

(52) U.S. Cl.
CPC ............... *B32B 5/024* (2013.01); *B32B 7/02* (2013.01); *G06F 1/1633* (2013.01); *B29K 2069/00* (2013.01); *B29K 2309/08* (2013.01); *B29K 2713/00* (2013.01); *B29L 2031/3481* (2013.01); *B32B 2250/03* (2013.01); *B32B 2250/40* (2013.01); *B32B 2260/023* (2013.01); *B32B 2260/046* (2013.01); *B32B 2262/101* (2013.01); *B32B 2262/106* (2013.01); *B32B 2262/14* (2013.01); *B32B 2307/302* (2013.01); *B32B 2307/72* (2013.01); *B32B 2307/732* (2013.01); *B32B 2457/00* (2013.01)

(58) Field of Classification Search
CPC ....... B32B 27/288; B32B 27/32; B32B 27/34; B32B 27/36; B32B 27/365; B32B 1/02; B32B 5/024; B32B 7/02; B32B 2250/24; B32B 2250/40; B32B 2262/101; B32B 2262/106; B32B 2307/302; B32B 2307/72; B32B 2307/732; B32B 2457/00; B32B 2250/03; B32B 2260/023; B32B 2260/046; B32B 2262/14; B29C 45/14508; G06F 1/1633; B29K 2069/00; B29K 2309/08; B29K 2713/00; B29L 2031/3481

See application file for complete search history.

(56) References Cited

U.S. PATENT DOCUMENTS

| | | | |
|---|---|---|---|
| 2007/0199797 | A1 | 8/2007 | Sell et al. |
| 2009/0117366 | A1 | 5/2009 | Honma |
| 2010/0040902 | A1 | 2/2010 | Mizrahi |
| 2011/0020640 | A1 | 1/2011 | Sherman et al. |
| 2011/0076437 | A1 | 3/2011 | Mckee |
| 2011/0290685 | A1 | 12/2011 | Kenney |
| 2013/0148288 | A1 | 6/2013 | Kenney |
| 2017/0203479 | A1 | 7/2017 | Laurin et al. |

FOREIGN PATENT DOCUMENTS

| | | | |
|---|---|---|---|
| EP | 2527139 | A1 | 11/2012 |
| JP | H03286851 | A | 12/1991 |
| JP | H05329948 | A | 12/1993 |
| JP | H06155599 | A | 6/1994 |
| JP | H1041645 | A | 2/1998 |
| JP | 2013124277 | A | 6/2013 |
| JP | 2014127518 | A | 7/2014 |
| WO | 2012019115 | A1 | 2/2012 |
| WO | 2013070447 | A2 | 5/2013 |
| WO | 2013109437 | A1 | 7/2013 |
| WO | 2015022948 | A | 2/2015 |

OTHER PUBLICATIONS

Johnson et al., "Mechanical Properties and Design of Sandwich Materials" Composites,vol. 17, No. 4, Oct. 1986, 8 Pages.
Machine Translation of JP2014127518; Date of Publication: Jul. 7, 2014; 40 Pages.
Written Opinion of the International Searching Authority for International Application No. PCT/IB2015/055211; International Filing Date: Jul. 9, 2015; dated Nov. 4, 2015; 5 Pages.
English Abstract of WO2015022948(A1); Date of Publication: Feb. 19, 2015; 1 Page.

THINWALL COMPOSITES FOR ELECTRONIC ENCLOSURES AND OTHER DEVICES

CROSS REFERENCE TO RELATED APPLICATIONS

This application is a 371 of International Application No. PCT/IB2015/055211, filed Jul. 9, 2015, which claims priority to U.S. Patent Application No. 62/022,333, filed Jul. 9, 2014 both of which are incorporated by reference in their entirety herein.

BACKGROUND

Housings for electronic devices, such as notebook, notepad and smartphone enclosures, can benefit from certain mechanical properties. For example, industry trends benefit from housings that are thin, light-weight, and can be manufactured at low cost. In an attempt to meet industry demand, a variety of materials are used for electronic device housings. However, efforts to make thinner and lighter housings using different materials and production methods have resulted in undesirable performance and cost tradeoffs.

U.S. Pat. No. 8,372,495 discloses a housing for an electronic device or other object formed in a layered configuration. The layer or sandwich construction imparts strength and rigidity while decreasing the overall weight to the housing. The case/housing may have a first layer and a second layer formed from a first material. The case may also include a core formed from a second material. Where the first layer may be bonded to a top surface of the core and the second layer may be bonded to a bottom surface of the core.

WO2013070447 discloses a photovoltaic module, comprising a transparent superstrate; a backsheet, wherein the backsheet comprises a core layer comprising a core composition formed from a first polycarbonate comprising dimethyl bisphenol cyclohexane carbonate repeat units and bisphenol-A, wherein the first polycarbonate has the structure wherein the dimethyl bisphenol cyclohexane carbonate repeat units are present in an amount of 10 wt. % to 50 wt. %, based on the total repeat units in the core composition; and a second polycarbonate selected from the group consisting of a bisphenol-A polycarbonate homopolymer, a polyphthalate carbonate copolymer, polycarbonate copolymer comprising 2-phenyl-3,3-bis(4-hydroxyphenyl) phthalimidine carbonate and bisphenol-A carbonate repeat units, a polycarbonate copolymer comprising bisphenol-A carbonate and tetrabromobisphenol A carbonate repeat units, and combinations comprising at least one of the foregoing; and a photovoltaic cell between the superstrate and the backsheet.

SUMMARY

Disclosed herein are A-B-A structures, housings comprising the structures, and methods of making the same.

In an embodiment, an A-B-A structure, can comprise: a core layer comprising a first thermoplastic material having a first density (Y), wherein the core layer has a core thickness and wherein the core layer comprise at least one of (i) a through plane thermal conductivity of greater than equal to 0.1 W/mK, and (ii) a core layer density (X) that is X≥0.8Y; a first outer layer comprising a second thermoplastic material located on a first side of the core layer; and a second outer layer comprising the second thermoplastic material located on a second side of the core layer opposite the first side; wherein the core thickness is 30% to 75% of a total thickness of the A-B-A structure.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

Figure 1:
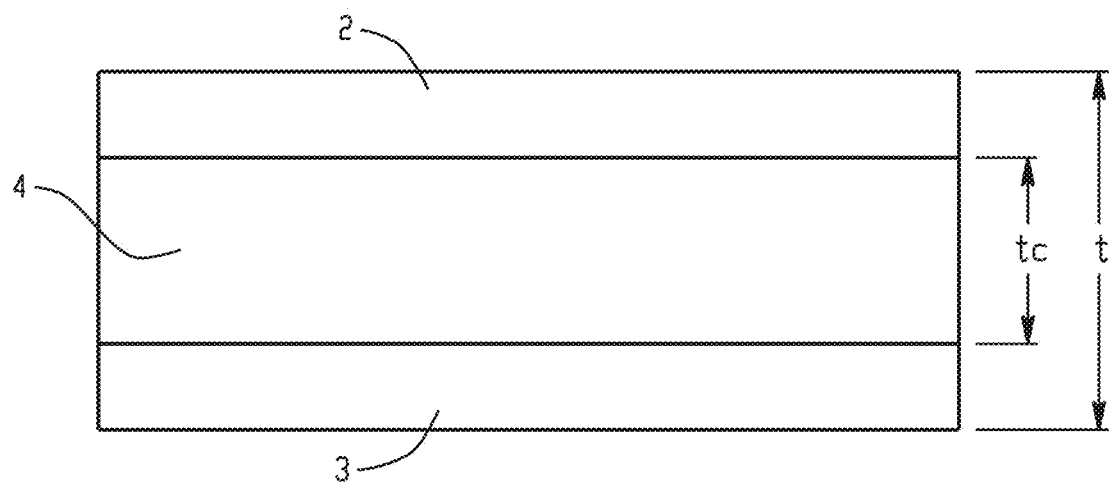
FIG. 1 is a cross sectional side view of an embodiment of an A-B-A structure.

Disclosed herein are A-B-A structures, housings (e.g., for electronic devices), and methods of making the same.

WO2013070447 does not disclose or suggest the use of a sandwich construction for an electronic device housing. Thus, WO2013070447 does not identify or solve the problem of producing a light-weight, thin enclosure that can meet the mechanical requirements of a housing for an electronic device.

U.S. Pat. No. 8,372,495 discloses the use of a sandwich construction including a unidirectional carbon fiber reinforced polymer (CFRP) skin and a lower density core. CFRP materials generally do not resist bending or stresses applied in a direction transverse to the length of the carbon fibers. In order to compensate for low transverse stiffness and strength, sandwich skins produced from unidirectional CFRP must be layered to produce quasi-isotropic constructions. Layered CFRP skins add to the cost, complexity and thickness of the sandwich construction. In addition, U.S. Pat. No. 8,373,495 describes low density cores made from foam or honeycomb structures. The thermal conductivity and diffusivity of these cores are much lower than a solid structure because a large portion of core volume consists of air. Foams and honeycomb structures have a thermal conductivity that can be less than 0.02 watts per meter kelvin (W/mK). Lower wall conductivity leads to higher internal temperatures, which is an undesirable effect for an electronic device housing. In addition, skin adhesion for a foam or honeycomb core is limited by the small area of contact between the skin and honeycomb. Sandwich constructions that are produced using low density foam or honeycomb cores have two other mechanical shortcomings. The first is related to lowered resistance to local penetration. For example, sharp local loads are resisted largely by the skins, and the core does not add significantly to penetration resistance. Second, sandwich constructions built with foam or honeycomb cores fail in compression when placed in flexure. The foam or honeycomb collapses underneath the skin before skin failure stresses are reached. Thus, failure strains for sandwich constructions with foam or honeycomb cores are lower than those that would occur if a solid core is used.

The featured A-B-A structures, housings, and methods of making described here provide light weight, thin-walled structures with high stiffness, high thermal conductivity, high flexural strength, and high peel strength. In particular, A-B-A structure can comprise: a core layer between outer layers, wherein the core layer has a through plane thermal conductivity of greater than equal to 0.1 Watts per meter-Kelvin (W/mK); wherein the thickness of the core layer is 30% to 75% of the total thickness of the A-B-A structure. For example, the A-B-A structure can comprising a first thermoplastic material; a first outer layer comprising a second thermoplastic material located on a first side of the core layer and in physical contact therewith; a second outer layer comprising the second thermoplastic material located on a second side of the core layer opposite the first side and in physical contact with the core layer; wherein the core layer has a through plane thermal conductivity of greater than equal to 0.1 Watts per meter-Kelvin (W/mK); wherein the thickness of the core layer is 30% to 75% of the total thickness of the A-B-A structure. A housing can comprise the A-B-A structure with a frame disposed around the structure, also optionally attached to the frame can be rib(s) and/or attachment features. If the housing is used for an electronic device, the housing can further comprise a backing, wherein the backing connects to the A-B-A structure via attachment features on the frame, and wherein electronic components can be located between the A-B-A structure and the backing.

In particular, a housing for an electronic device can comprise: a solid core layer comprising a first thermoplastic material; a first outer layer comprising a second thermoplastic material located on a first side of the core layer; a second outer layer comprising the second thermoplastic material located on a second side of the core layer opposite the first side; wherein the core layer has a through plane thermal conductivity of greater than equal to 0.1 Watts per meter-Kelvin (W/mK); wherein the thickness of the core layer is 30% to 75% of the total thickness of the A-B-A structure.

This disclosure relates to an A-B-A structure, a housing comprising the A-B-A structure, and methods of making the same. In particular, disclosed herein is a thin-walled A-B-A structure including a thermoplastic composite construction. The composite construction can include a sandwich construction including outer layers of reinforced material with an inner core of a thermoplastic material which may or may not be reinforced. The inner core can be a solid thermoplastic material or a substantially solid thermoplastic material. The present disclosure describes several less beneficial examples, to contrast with examples that are more beneficial.

In one less beneficial approach, continuously reinforced thermoplastic "through thickness" composites (continuous reinforced layer(s) of one composition throughout) can be used to form thin-wall enclosures. Fabric reinforced systems offer benefits in mechanical properties (e.g., stiffness, strength, and in-plane isotropy) and formability. However, two factors have limited the use of these materials in enclosures. First, the cost of continuously reinforced systems is 4 to 5 times greater than the highest performance short carbon filled thermoplastics.

In another less beneficial approach, full "through thickness" multilayer composite laminates (in other words, continuous reinforcement throughout; i.e., the same material in all layers) can be used in low volume, high end notebook enclosures. Typically, these materials can be thermoset materials similar to those used in the aerospace industry. However, the performance benefits of these stiff lightweight structures are outweighed by material costs and time consuming manufacturing methods. This combination of factors has limited their use in the broader enclosure market. Some manufacturers have adopted machined aluminum as a material solution. However, this approach is suffers the same drawbacks as the "through thickness" laminates.

Glass, carbon and alternative short fiber reinforcements have been used to form enclosures, but the trend toward thinner wall thicknesses (e.g., less than 1.0 millimeter (mm)) creates challenging processing conditions. This is compounded by the fact that thinner walls require higher mechanical properties, which means higher reinforcement loadings to attain stiffer/high aspect ratio reinforcements. These specialty short fiber reinforced compounds have high melt viscosities which make them challenging to mold. In addition, high aspect ratio reinforcements result in higher than normal flow induced fiber orientation and (therefore) mechanical performance variability. Manufacturers of notebooks, notepads and smartphones are actively searching for materials that offer better mechanical properties, lower levels of in-plane anisotropy, and unobstructed package spaces.

Attempts have been made using honeycomb or other low density foam structures between skin layers, wherein the skin layers form a total of less than or equal to 10% of the thickness of the total structure. However, these laminates exhibit low peel strength (typically less than 10 in-lb/in but occasionally up to 25 in-lb/in (depending on materials) because the skin layers are not in constant contact with the lightweight cores. For example, the gaps between the walls of the honeycomb structure are not in contact with the skin layer. In addition, these laminates have a lower thermal conductivity and diffusivity than a solid structure of the same material. As such, heat will be trapped by these structures, which is not favorable for a housing for an electronic device and can negatively impact the performance of the device. Finally, low density cores such as honeycomb and foam result in lowered resistance to local penetration. This is an especially important attribute for electrical enclosures where exposure of internal wiring and circuitry may pose a safety risk. In addition, structures built using low density cores rarely achieve their maximum theoretical mechanical capabilities because the cores will fail in compression prior to skin rupture. These attributes, combined with lower levels of thermal conductivity make low density cores less useful in sandwich structures for electrical enclosures.

Accordingly, a need exists for housings for electronic devices that are thin, low weight (as compared to a through thickness structure having the same stiffness and using the same materials, has a weight that is greater than or equal to 12%, e.g., greater than or equal to 15% lighter than a through thickness structure), cost effective, and possess suitable thermal conductivity and mechanical properties.

More beneficial approaches described here include thin-walled housings for electronic devices and methods of making the same. It is believed that the favorable results obtained herein (e.g., a thin, low weight, high strength A-B-A structure), can be achieved through a sandwich construction including a thermoplastic core (e.g., a solid thermoplastic core) between thermoplastic composite outer layers. Specific parametric maxima and minima are disclosed to highlight certain examples with desirable performance.

The A-B-A structure disclosed herein are A-B-A sandwich constructions in which an "A" material forms a first outer layer and a second outer layer located on opposite sides of a solid core layer formed from a "B" material. The solid core can include a first thermoplastic material and the first outer layer and second outer layer can include a second thermoplastic material. The first and second thermoplastic materials are compatible (and hence adhere to each other). These materials can be the same type of thermoplastic material, with different viscosities (e.g., having different molecular weights and/or having different reinforcement loadings). The A-B-A structure can utilize highly filled (e.g., greater than or equal to 35 volume percent (vol. %), e.g., 35 vol. % to 70 vol. % reinforcing material, based upon the total volume of the outer layer) outer layers ("A"). The outer layers can be continuously reinforced, e.g., can comprise a fiber that was produced in a continuous form.

The overall thickness of the A-B-A structure can be less than or equal to 1.6 millimeters (mm), for example, less than or equal to 1.5 mm, or less than or equal to 1.25 mm, or less than or equal to 1.0 mm. The overall thickness of the A-B-A structure can be 0.5 mm to 1.5 mm, for example 0.5 mm to 1.25 mm, or 0.75 mm to 1.1 mm. The core layer can include (have a core thickness ($t_c$) of) 30% to 75% of the total thickness of the A-B-A structure. The core layer can include 40% to 60% of the total thickness of the A-B-A structure. The core layer can include 45% to 55% of the total thickness of the A-B-A structure. The core layer can include 55% to 70% of the total thickness of the A-B-A structure. The flexural modulus of the A-B-A structure can be greater than or equal to 2,000,000 pounds per square inch (psi) (13.8 GigaPascals (GPa)), for example, greater than or equal to 5,000,000 psi (34.5 GPa).

The housing can comprise a frame that can be located about a periphery of at least a portion of the A-B-A structure. The frame can include a material that is compatible with the A-B-A structure, and desirably, a material that minimally changes the shape of the A-B-A structure before (initial shape) and after (final shape) the frame is attached (e.g., the change from initial shape to final shape is a bowing of less than or equal to 2 mm, specifically less than or equal to 1 mm, or less than or equal to 0.2 mm, or no change). For example, if the A-B-A structure is flat (no curvature), then the change from flat (e.g. the separation from a flat surface) is less than or equal to 2 mm, specifically less than or equal to 1 mm, or less than or equal to 0.2 mm, or no separation (measurable without a microscope). Desirably, there is no change in the shape of the A-B-A structure (e.g. a deflection from initial shape to final shape of 0%). For example, if a flat final article is desired, the frame can include a material that has a coefficient of thermal expansion that differs from the coefficient of thermal expansion of the A-B-A laminate such that, before the frame is attached and after the frame has been molded onto the A-B-A laminate, the A-B-A laminate remains flat. For example, the frame can comprise a thermoplastic material (e.g., the first thermoplastic material or the second thermoplastic material) and reinforcement (e.g., filler or reinforcing material). Possible reinforcements include fibers (e.g., short fibers (such as fibers having a length of less than or equal to 10 mm). The reinforcement material can be any of the materials used for the filler or reinforcing material in the A-B-A structure as described below. For example the reinforcement can comprise high stiffness inorganic fibers (e.g., glass, carbon, quartz, boron, and combinations comprising at least one of the foregoing), wherein high stiffness refers to a tensile modulus of greater than or equal to 35 GPa, for example, a tensile modulus of greater than or equal to 45 GPa.

Optionally, the frame can be a metallic frame, such as magnesium or aluminum. For example, the frame can be a tube of metallic material that is perforated to encourage mechanical adhesion to the A-B-A structure (e.g., to the first and/or second material).

The frame can have a thickness greater than the thickness of the A-B-A laminate (e.g., as measured from the outer surface of one A layer to the outer surface of the other A layer). The frame can have a thickness less than or equal to the thickness of the A-B-A laminate. The frame can allow for the inclusion of attachment features, ribs, and corner radii.

The core layer can have a thermal conductivity that enables the dissipation of heat from the electronic device. For example, the first thermoplastic material can have a through plane thermal conductivity of greater than or equal to 0.1 W/mK.

Thermal conductivity is determined in accordance with ASTM E1461 using laser flash method with a Nanoflash LFA 447 xenon flash apparatus available from Netzsch. For the through plane thermal conductivity, test specimens were cut into 10×10×3 mm square samples from an injection molded 80×10×3 mm IZOD bar. The thermal conductivity (k(T)) is calculated in units of W/mK. The thermal diffusivity ($\alpha(T)$) is measured in units of square centimeters per second ($cm^2/s$), and can be determined by measurement of time needed for the rear face of a thin-disc specimen to achieve maximum temperature rise after a short energy pulse input on the front face. The pulse is emitted by the xenon flash lamp with the fixed parameters setting on power, filter, pulse width, pre-amp and main amp. The thermal diffusivity can be calculated as shown in formula (1), below $$\alpha = 0.1388 * d^2 / t_{50} \qquad (1)$$

where d is the thickness of the sample measured in micrometers and $t_{50}$ is half of the time for the rear face to achieve highest temperature rise. The specific heat (Cp) is measured in Joules per gram-Kelvin (J/gK) and the density ($\rho$) is measured in grams per cubic centimeter ($g/cm^3$). The specific heat is measured by comparison between the testing sample and a standard sample of know specific heat. The density is determined using a water immersion method (ASTM D792). The thermal conductivity is calculated as shown in formula (3), below:

$$k(T)=\alpha(T)*c_p(T)*\rho(T) \qquad (2)$$

\wherein k(T) refers to thermal conductivity; α(T) refers to thermal diffusivity; $c_p$(T) refers to specific heat, and ρ(T) refers to the density of the specimen.

The core layer can be solid, wherein the core layer can include a density that is not reduced by air pockets or structural design, such as a honeycomb structure. For example, the core layer can have a density (X) that is greater than or equal to the density (Y) of the first thermoplastic material. In another embodiment, the core layer can be a structural foam, wherein the core layer can include a density (X) that is X≥0.8Y.

The first thermoplastic material, the second thermoplastic material, or both first thermoplastic material and the second thermoplastic material can include polycarbonate (PC), acrylonitrile butadiene styrene (ABS), acrylic rubber, ethylene-vinyl acetate (EVA), ethylene vinyl alcohol (EVOH), liquid crystal polymer (LCP), methacrylate styrene butadiene (MBS), polyacetal (POM or acetal), polyacrylate and polymethacrylate (also known collectively as acrylics), polyacrylonitrile (PAN), polyamide (PA, also known as nylon), polyamide-imide (PAI), polyaryletherketone (PAEK), polybutadiene (PBD), polybutylene (PB), polyesters such as polybutylene terephthalate (PBT), polycaprolactone (PCL), polyethylene terephthalate (PET), polycyclohexylene dimethylene terephthalate (PCT), and polyhydroxyalkanoates (PHAs), polyketone (PK), polyolefins such as polyethylene (PE) and polypropylene (PP), polyetheretherketone (PEEK), polyetherketoneketone (PEKK), polyetherimide (PEI), polyethersulfone (PES), polysulfone, polyimide (PI), polylactic acid (PLA), polymethylpentene (PMP), polyphenylene oxide (PPO), polyphenylene sulfide (PPS), polyphthalamide (PPA), polypropylene (PP), polystyrene (PS), polysulfone (PSU), polyphenylsulfone, polytrimethylene terephthalate (PTT), polyurethane (PU), styrene-acrylonitrile (SAN), or any combination comprising at least one of the foregoing. For example, the first thermoplastic material can comprise polycarbonate, polyetherimide, polyphenylene oxide, and nylon, and combinations comprising at least one of the foregoing. Polycarbonate blends with ABS, SAN, PBT, PET, PCT, PEI, PTFE, or combinations thereof are of particular note to attain the balance of the desirable properties such as melt flow, impact and chemical resistance. The first thermoplastic material can include SABIC LEXAN™ 121, SABIC Thermocomp DC0049XF, and similar materials, commercially available from SABIC Innovative Plastics.

The core layer ("B" layer) can be neat (no reinforcement). Alternatively, the core layer can include a reinforcing material. The reinforcing material can include fibers, (continuous, chopped, woven, and the like). The core layer can include 0 to 35 vol % reinforcing material and 100 to 65 vol. % first thermoplastic material. The core layer can include about 10 vol % to 35 vol % reinforcing material (e.g., glass fibers) and 90 to 65 vol % first thermoplastic material. The core layer can include about 5 vol % to 30 vol % reinforcing material (e.g., carbon fibers) and 95 to 70 vol % first thermoplastic material. The core layer can include about 5 vol % to 25 vol % reinforcing material (e.g., carbon fibers) and 95 to 75 vol % first thermoplastic material. The core layer can comprise short fibers (e.g. short glass fibers).

The "A" layer can include fabric based composites (e.g., reinforcing material in the form of a fabric in a matrix of the second thermoplastic material). For example, satin harness style weaves and low basis weight "spread tow" fabrics can be used. As used herein low basis weight is less than 50 grams per square meter (gsm). The fabric based composite can have a basis weight of 50 to 500 gsm. The fabric based composite can have a basis weight of 100 to 400 gsm. The fabric based composite can have a basis weight of 200 to 400 gsm.

Figure 16:
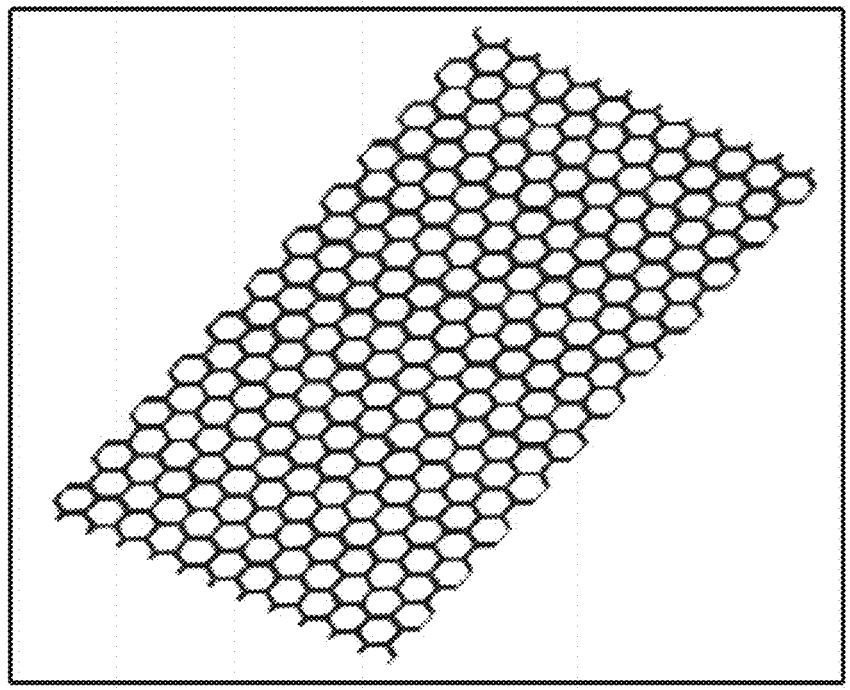
FIG. 16 is a prospective view of an embodiment of a patterned fabric for use in the "A" layer of an A-B-A structure.
Figure 17:
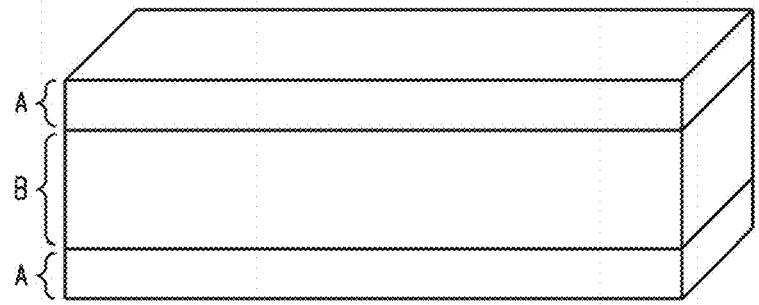
FIG. 17 is a cross sectional side view of an embodiment of an A-B-A structure with a frame that can be used as a housing such as for an electronic device.

The second thermoplastic material can include co-mingled, co-woven and stretch broken yarn fabrics. A variety of technical weaves can be used including, but not limited to, plain, twill, basket, leno and satin weaves. The fabric can be a patterned fiber layer, e.g., a patterned fabric within a second material. The pattern of the material can be designed to reduce the amount of fibers (and hence weight), while maintaining strength. Therefore, the "A" layer can be custom designed for the particular application wherein the fibers are oriented to enhance structural integrity in areas that are higher stress during use. Some examples of patterned fabrics include polygonal cells (e.g., hexagonal cells (see FIG. 16), triangular cells, pentagonal cells), rounded cells, or a combination comprising at least one of the foregoing, e.g., the patterned fabric can be hexagonal cells. In some embodiments, the patterned fabric can be a perforated material. As used herein, a patterned fabric is a tailored pattern that locates fabric where needed in order to attain the strength and stiffness for the application of the article. In some embodiments patterned fabric is not a uniformly repeated pattern. The patterned fabric can be an open weave (e.g., a woven fabric with spaces between adjacent strands). The patterned fabric can have a non-uniform density across the fabric, such as illustrated in FIG. 16, wherein some areas comprise fabric and others are free of fabric. FIG. 17 illustrates an A-B-A structure wherein the outer layers "A" comprise a patterned fabric.

The reinforcing material can comprise aramid, carbon, basalt, glass, plastic (e.g., thermoplastic polymer, thermoset polymer), quartz, boron, cellulose, or natural fibers, as well as combinations comprising at least one of the foregoing, such as high stiffness inorganic fibers (e.g., glass, carbon, quartz, boron, and combinations comprising at least one of the foregoing). High stiffness refers to a tensile modulus of greater than or equal to 35 GPa. For example, the fibers can be formed of liquid crystal polymer, high tenacity polymer (e.g., polypropylene, polyethylene, poly(hexano-6-lactam), poly[imino(1,6-dioxohexamethylene) imnohexamethylene]), as well as combinations comprising at least one of the foregoing. An exemplary fiber filled resin is LEXAN™ resin, commercially available from SABIC Innovative Plastics. Another exemplary fibrous material can include fiber reinforced thermoplastics such as ULTEM™ resins, commercially available from SABIC Innovative Plastics). For example, a variety of reinforcement fibers may be used for the outer layers. For example, E-glass, S-glass and various carbon based systems, and combinations comprising at least one of the foregoing, may be employed, e.g., a glass (e.g. E-glass)-carbon hybrid fabric. The outer layer can have a different reinforcing material than the core layer. Certain enclosure applications may need radio frequency transparency. Thus, glass reinforcement can be used in the outer layer in these applications. An exemplary reinforcing material (e.g., for the outer layers) is Tencate CETEX TC925 FST or Tencate CETEX TC1000 commercially available from Ten Cate Advanced Composites.

The second thermoplastic material can be any of the materials listed above for the first thermoplastic material. For example, the second thermoplastic material can include polypropylene (PP), polyamide (PA), polycarbonate (PC), polyphenylene sulfide (PPS), polyetherimide (PEI), polyetheretherketone (PEEK), and the like. The outer layers can include reinforcing material loading levels of greater than or equal to 35 volume percent (vol. %), e.g., 35 vol. % to 70 vol. % reinforcing material, or 40 vol. % to 60 vol. % reinforcing material, based upon a total weight of the outer layer.

The second thermoplastic material can be chemically compatible with the first thermoplastic material to promote adhesion between the outer layers and the core layer. Thus, the use of an adhesive between the core layer and the outer layer can be minimized or completely eliminated. For example, the first thermoplastic material and the second thermoplastic material can have the same base polymer (e.g., polycarbonates with different amounts and/or types of reinforcing material). The viscosity of the first thermoplastic material can be different from the viscosity of the second thermoplastic material. For example, the first thermoplastic material can have a higher viscosity than the second thermoplastic material. Thus, the core layer made from the higher viscosity first thermoplastic material can resist "squeezing out" in preforming operations. The difference in melt flow rate for the second thermoplastic material versus the first thermoplastic material can be such that a melt flow rate of the second thermoplastic material≥2×melt flow rate of the first thermoplastic material, e.g., melt flow rate of the second thermoplastic material≥3×melt flow rate of the first thermoplastic material. For example for polycarbonate based materials, second thermoplastic material can have a melt flow rate of greater than or equal to 25 grams per 10 minutes (g/10 min), or greater than or equal to 45 g/10 min, or greater than or equal to 50 g/10 min. The first thermoplastic material can have a melt flow rate of less than or equal to 10 g/10 min. Melt flow rate is determined in accordance with ASTM D1238, using a temperature and weight appropriate for the material of the layers as is specified in the standard.

The first and second thermoplastic materials can include coefficients of thermal expansions that are "matched." As used herein, "matched" means that a flat A-B-A structure can be formed (e.g., the core layer can be adhered to the outer layers, and once cooled, the structure is not warped. For example, the A-B-A structure can have a bowing that is less than or equal to 2 mm from flat, e.g., less than or equal to 1 mm from flat, or less than or equal to 2 mm from flat, such as no measurable distance from flat (without a microscope). As used herein, "matched" means having a value that differs by less than or equal to 20%. The coefficients of thermal expansion for the first thermoplastic material and the second thermoplastic material can differ by less than or equal to 10%. The coefficients of thermal expansion for the first thermoplastic material and the second thermoplastic material can differ by less than or equal to 5%.

The housing and frame can be manufactured in a single step through injection molding. For example, the "A" or outer layers (e.g., preformed patterned fabric impregnated outer layers or reinforced outer layers) can be prepositioned on opposite sides of an injection mold. Optionally, static charge, mechanical holders (e.g., pins), vacuum, or other methods, may be used to hold the precut layers in-place. In this embodiment, the layer that is placed on the movable mold half can be pre-pierced for hot drops and ribs and molded-in features. The mold is closed and the "B" or core layer is injected between the "A" or outer layers. In this manner, a center A-B-A region is formed. The frame, consisting entirely of the "B" layer can be formed simultaneously and surrounds the central A-B-A.

In the alternative, a premolded frame comprising a compatible resin is placed in the mold along with the "A" or outer layers. A small gap (1-10 mm) is left between the frame and the "A" layer. The mold is closed and the filling process proceeds as previously described. The "B" layer is used to bond the premolded frame to the central A-B-A laminate. Thus, an unreinforced (e.g., no filler) "B" layer can be used and the frame material can include another material that is compatible with the "B" layer.

According to another method, an A-B-A sandwich housing is placed in an injection molding tool. The "A" material can be the second thermoplastic material and the "B" material can be the first thermoplastic material. A frame is then molded around the housing in an overmolding operation. The frame resin is selected to have physical and thermoelastic compatibility with the housing material. Optionally, the housing can be trimmed or otherwise treated prior to the overmolding process to enhance bonding of the frame to the core material. Treatments can include roughening, slotting, drilling, and the like.

In the alternative, an A-B-A sandwich housing can be formed separately from a frame and then joined together, e.g., through welding such as ultrasonic welding.

The outer layers can be preformed, e.g., as continuous reinforced outer layers or patterned fabric reinforced outer layers. These preformed outer layers can then be used in the processes described above.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

FIG. 1 illustrates the A-B-A sandwich construction. As shown in FIG. 1, the A-B-A structure includes first outer layer 2 located on a first surface of core layer 4. Second outer layer 3 is located on a second surface of core layer 4 opposite the first surface. Core layer 4 can include a first thermoplastic material and a core thickness ($t_c$). First outer layer 2 and second outer layer 3 can include a second thermoplastic material. A-B-A structure includes a total thickness t, which includes core thickness ($t_c$), and the thickness of first outer layer and second outer layer.

Figure 2:
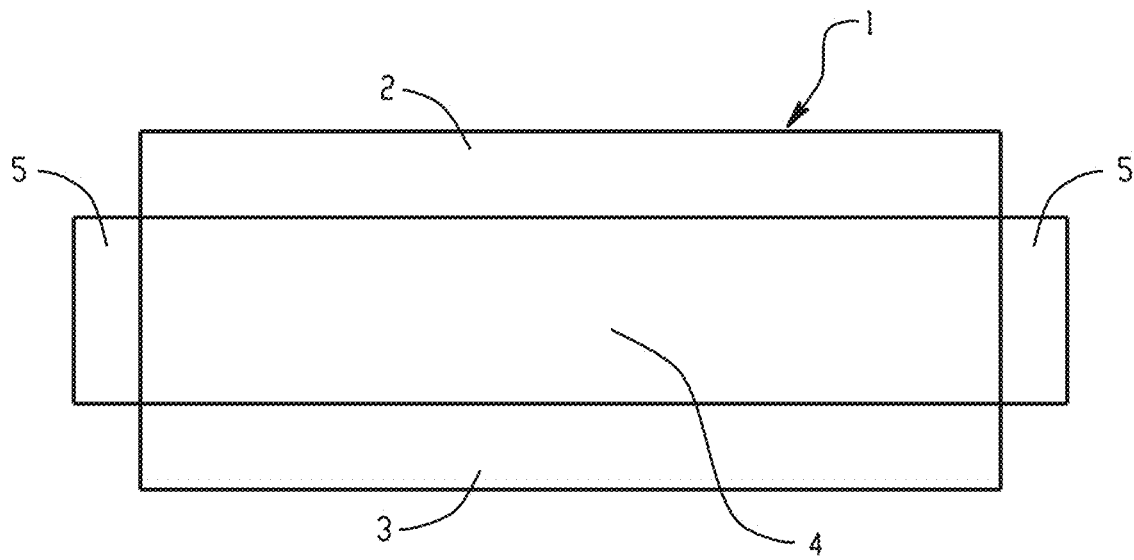
FIG. 2 is a cross sectional side view of an embodiment of an A-B-A structure with a frame that can be used as a housing.
Figure 3:
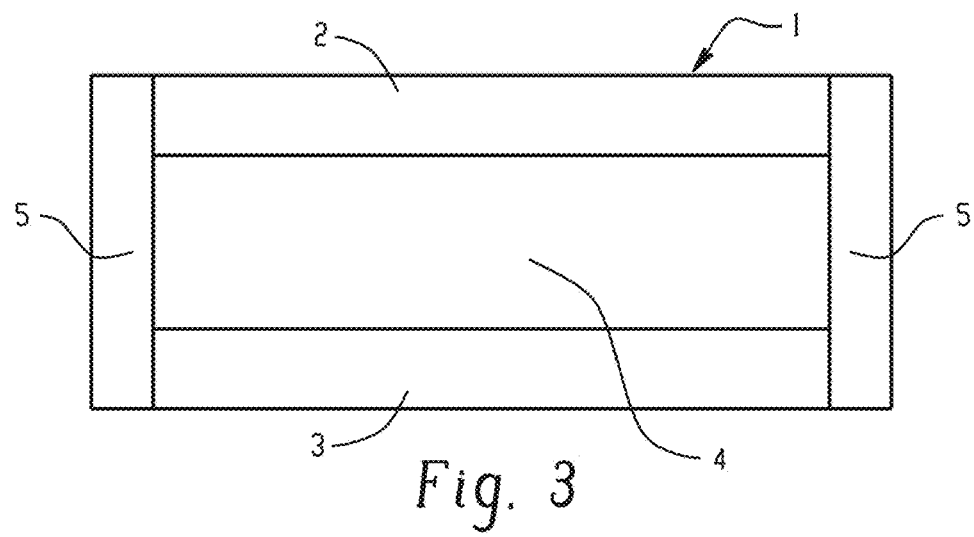
FIG. 3 is a cross sectional side view of an embodiment of an A-B-A structure with a frame that can be used as a housing.

FIG. 2 illustrates housing 1 incorporating frame 5 enclosing at least a portion of core layer 4 of the A-B-A structure. As shown in FIG. 2, frame 5 can have a thickness that is less than or equal to the thickness of core layer 4. As shown in FIG. 3, the frame can have a thickness greater than the thickness of core layer 4. For example, frame 5 can have a thickness less than or equal to the thickness of housing 1 (e.g., first outer layer 2, second outer layer 3, and core layer 4).

Figure 4:
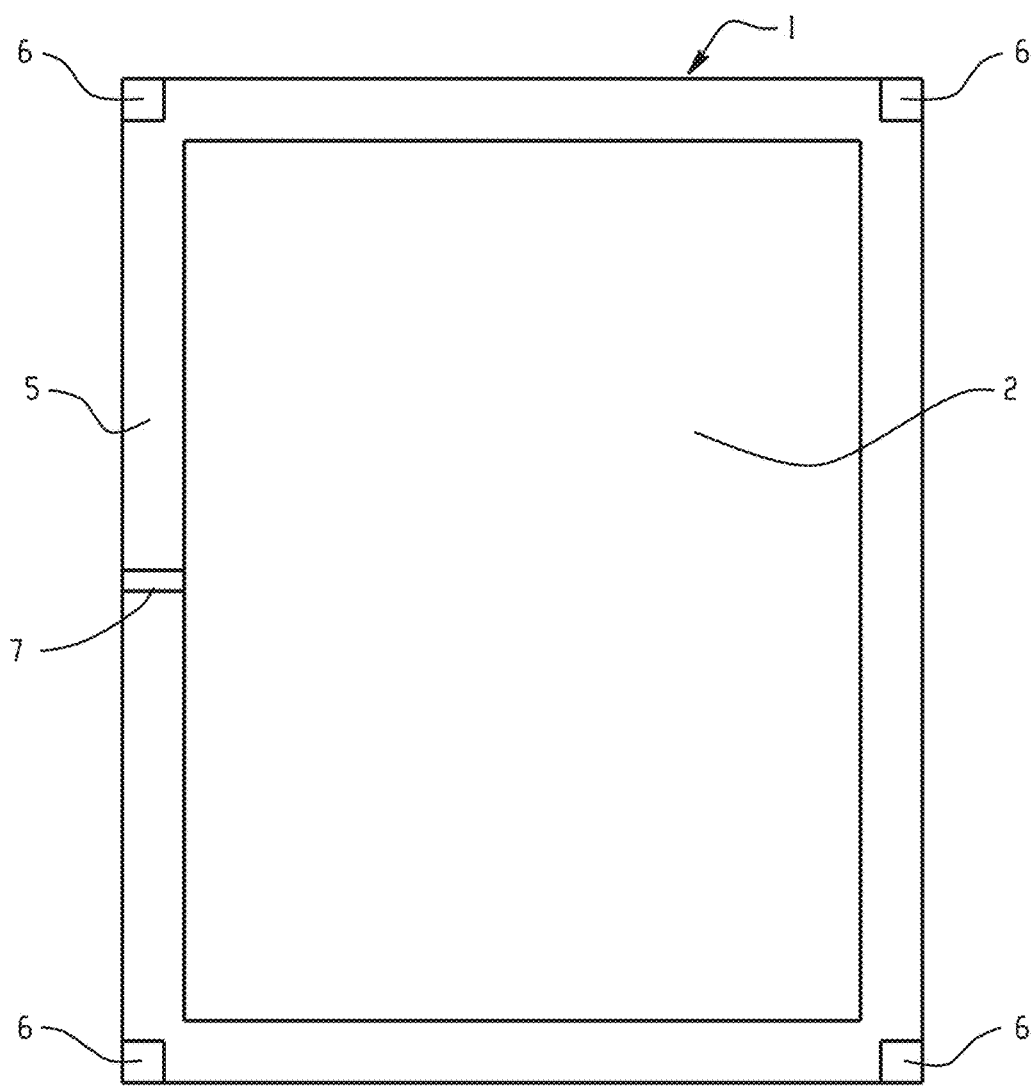
FIG. 4 is a top view of an embodiment of an embodiment of an A-B-A structure with a frame that can be used as a housing.

FIG. 4 is a top view of housing 1 including frame 5 and the A-B-A structure. As shown in FIG. 4, frame 5 can extend outward in each direction beyond first outer layer 2. Frame 5 can include one or more attachment portions 6, which can be located anywhere on frame 5. In addition, frame 5 can include one or more reinforcement structures 7, such as ribs, and the like. Frame 5 can also include portions with rounded edges (e.g., corner radii) (e.g., see FIGS. 13 and 14).

Figures 5, 6:
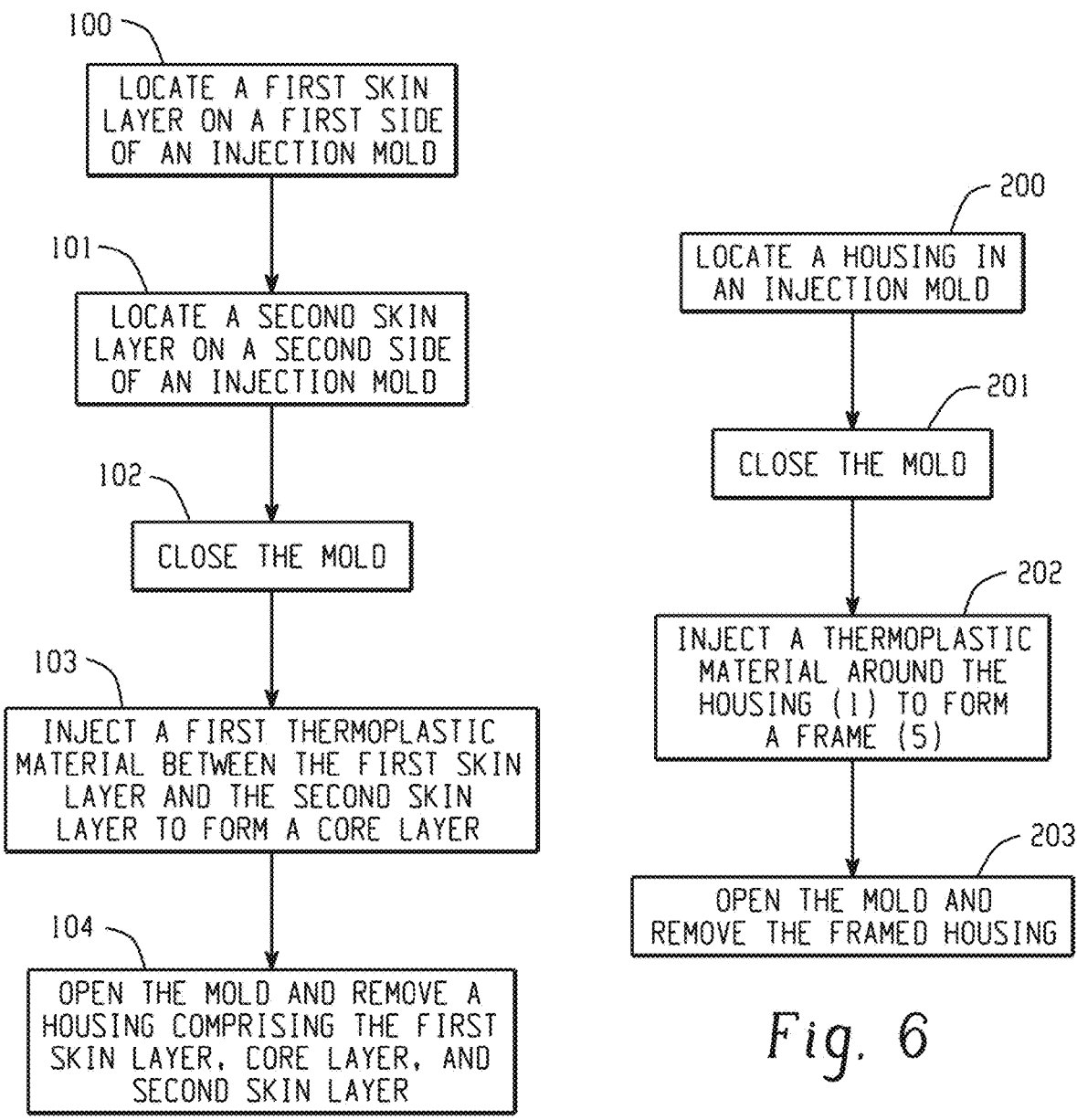
FIG. 5 is a flow diagram depicting a process for forming the A-B-A structure of FIGS. 1-4.
FIG. 6 is a flow diagram depicting a process for forming the A-B-A structure of FIGS. 1-4.

FIG. 5 illustrates a process for manufacturing for manufacturing a A-B-A structure or a housing. As illustrated in FIG. 5, step 100 includes locating a first outer layer 2 on a first side of an injection mold. In step 101, a second outer layer 3 is located on a second side of an injection mold, opposite the first side. In step 102, the mold is closed. A first thermoplastic material is injected between the first outer layer 2 and the second outer layer 3 to form a core layer 4 in step 103. Optionally, a housing can be formed wherein the first thermoplastic material can extend beyond first outer layer 2 and second outer layer 3 to form frame 5 extending from core layer 4. In step 104, the mold is opened and A-B-A structure or housing 1 including first outer layer 2, core layer 4, second outer layer 4, and optionally frame 5 is removed from the mold.

FIG. 6 illustrates a process for manufacturing a housing, e.g., for an electronic device. As illustrated in FIG. 6, step 200 includes locating an A-B-A structure in an injection mold. The housing can include any of the housings described herein. In particular, the A-B-A structure of FIG. 1 can be utilized in step 200. For example, the A-B-A structure can include solid core layer 4 formed from a first thermoplastic material, first outer layer 2 including a second thermoplastic material located on a first side of core layer 4, second outer layer 3 including the second thermoplastic material located on a second side of the core layer 4 opposite the first side. Step 201 includes closing the mold. In step 202, a thermoplastic material can be injected around the A-B-A structure to form a frame 5 attached to the A-B-A structure. The frame and at least one layer of the A-B-A structure (e.g., core layer 4) can be coupled through melt phase bonding. In step 203, the mold is opened and the framed housing is removed.

EXAMPLES

A set of multi-span flexural tests were conducted to assess the effectiveness of the A-B-A constructions. A thin wall sandwich composite consisting of single ply 0.25 mm Tencate CETEX TC 925 FST outer layers (7581 style E-glass fabric in a polycarbonate matrix, with a 50 vol % loading, and a thickness of 0.24 mm) and a 0.50 mm unreinforced LEXAN™ 8B35 core was laminated in a vacuum assisted press. Total laminate thickness was 1.00 mm and core/outer layer thickness ratio was 0.50. Nominal flexural dimensions were 25 mm×100 mm. Samples were tested at four spans to eliminate geometric and shear related effects. Samples were also taken in three orientations to test for anisotropy. Specifically, flexural samples were machined in directions that correspond to the "warp", "weft" and "off" orientations of the outer layers. TC 925 FST uses a 7581 E-glass fabric. This is an 8 harness satin with a relatively "balanced" structure. Directional samples were produced to aid in the understanding of laminate anisotropy. An identical set of samples and tests were run on as-produced 1.00 mm CETEX TC 925 FST laminates. These 4-layer through-thickness controls represent the maximum achievable properties with this combination of resin (PC) and reinforcement (7581 style E-glass fabric). Results are shown in Table 1.

TABLE 1

Flexural Modulus Comparison, 1.00 mm PC/E-glass (66 Wt. %) Laminates Multi-span 3 Pt. Flexural Modulii [GPa]

| | | 3 Pt. Flexural Span [mm] | | | | Average | % of |
|---|---|---|---|---|---|---|---|
| | | 40 | 50 | 60 | 70 | [GPa] | Thru |
| PC/E-glass ABA | Warp | 17.49 | 20.12 | 20.42 | 20.42 | 19.61 | 75.4% |
| | Weft | 15.20 | 15.83 | 16.65 | 16.65 | 16.08 | 85.7% |
| | Off | 11.36 | 11.88 | 11.67 | 11.67 | 11.65 | 83.2% |
| PC/E-glass thru | Warp | 23.24 | 26.17 | 27.34 | 27.34 | 26.02 | |
| | Weft | 16.94 | 18.77 | 19.67 | 19.67 | 18.77 | |
| | Off | 13.49 | 14.01 | 14.23 | 14.23 | 13.99 | |

Note:
"A" layers are 0.25 mm Tencate CETEX TC 925 FST.
"B" is 0.50 mm LEXAN 8B35 unreinforced PC film Mathematical models proposed by Johnson and Sims[1] predict flexural moduli that are 87% of through thickness values (assuming core/total thickness ratio=0.50). Experimental results are close to these predictions. Data and theory support the concept that through thickness composites are not required to create stiff thin structures for use in electronic enclosures. The immediate benefits are lighter weight and lower costs. In this instance, 50% of the composite laminate is removed from the core with a modest 15%-20% reduction in stiffness.

Figure 15:
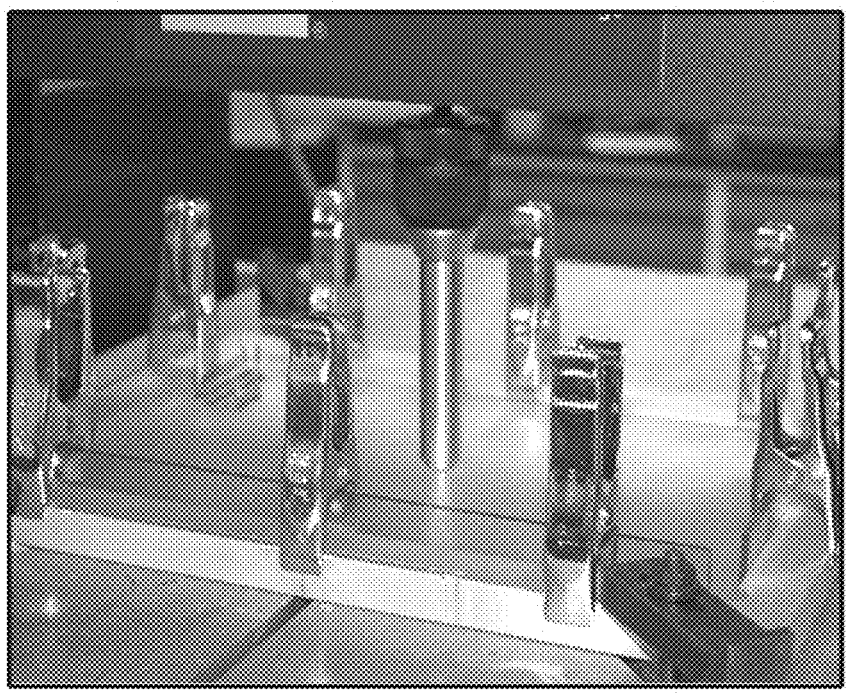
FIG. 15 is a photo of a center loaded plate fixture for testing the constructions of Table 1.

Additional characterization work was done to verify the utility of A-B-A laminates in a laptop cover loading scenario. 220 mm×335 mm laminates of the constructions described in Table 2 were tested in a center loaded plate fixture (FIG. 15). A 100 Newton (N) load was applied to the center of the fully supported plate using a 13 mm circular loading nose. Laminates were tested with the long plate dimension (335 mm) aligned with the "warp" and "weft" directions of the CETEX TC 925 FST outer layers. In addition, a third laminate was taken in the "off" direction—a 45 degree offset from warp and weft. Samples were preloaded to 7 N to remove residual laminate "twist". Final deflections reflect movement after application of an additional 93 N. Similar procedures were used for A-cover qualification by laptop manufacturers. Results are shown in Table 2.

TABLE 2

Centerpoint Plate Deflections, 100 N Load/220 mm × 335 mm Panel

| | CETEX A-B-A[1] | | | CETEX Thru[2] | | | Al |
|---|---|---|---|---|---|---|---|
| | Overall Thickness | | | | | | |
| Sample Description | 1.00 mm | 1.25 mm | 1.40 mm | 1.00 mm, As-produced | 1.00 mm, Off-core | 1.50 mm, As-Produced | 0.65 mm |
| Warp, Side 1 | 6.34 | 6.24 | 6.22 | 5.44 | 5.40 | 4.26 | 4.20 |
| Warp, Side 2 | 6.60 | 6.25 | 5.86 | 5.33 | 5.44 | 4.56 | 3.99 |
| Weft, Side 1 | 6.78 | 6.39 | 5.96 | 5.75 | 5.43 | 4.56 | |
| Weft, Side 2 | 6.26 | 5.98 | 5.97 | 5.46 | 5.26 | 4.13 | |
| Off, Side 1 | 6.34 | 6.33 | 6.23 | 5.98 | 5.37 | 4.38 | |

TABLE 2-continued

Centerpoint Plate Deflections, 100 N Load/220 mm × 335 mm Panel

| | CETEX A-B-A[1] | | | CETEX Thru[2] | | | Al[3] |
|---|---|---|---|---|---|---|---|
| | | | | Overall Thickness | | | |
| Sample Description | 1.00 mm | 1.25 mm | 1.40 mm | 1.00 mm, As-produced | 1.00 mm, Off-core | 1.50 mm, As-Produced | 0.65 mm |
| Off, Side 2 | 6.85 | 6.42 | 6.06 | 5.59 | 5.15 | 4.60 | |
| Average | 3.53 | 6.27 | 6.05 | 5.59 | 5.34 | 4.42 | |
| Std. Dev. | 0.25 | 0.16 | 0.15 | 0.24 | 0.11 | 0.19 | |
| Deflection Increase | 16.8% | | | | | | |

[1]A layer is CETEX having a thickness of 0.24 mm.
[2]Through thickness is a CETEX multilayer sheet.
[3]Aluminum sheet.
Side 1 and Side 2 refer to the same sample being tested on both sides (tested, flipped, and retested). The difference in the results is due to any warpage/bow in the construction.

Deflection of fully supported CETEX TC925 FST A-B-A constructions at 1.00 mm thickness (core/skin ratio of 0.50) is 17% larger than through thickness deflection. This is consistent with flexural results and further evidence of the benefits of A-B-A constructions for thinwall electronic enclosures. Fully supported plate bending is more complicated than simple flexural loading, because large in-plane tensile stresses are often present. The relatively "thick" outer layers that are specified in this document are better able to handle tensile stresses than "thin" skins that are used in traditional A-B-A constructions. This distinction is supported by the experimental results in Table 2. Data in this table also shows that substantial increases in core thickness (40%) rapidly meet with diminishing returns, e.g. lower deflections, at the wall thicknesses required for electronic enclosures. The core-thickness ratios that are described in the embodiments and claims of this document offer a good balance of stiffness and cost/weight reduction.

Figure 7:
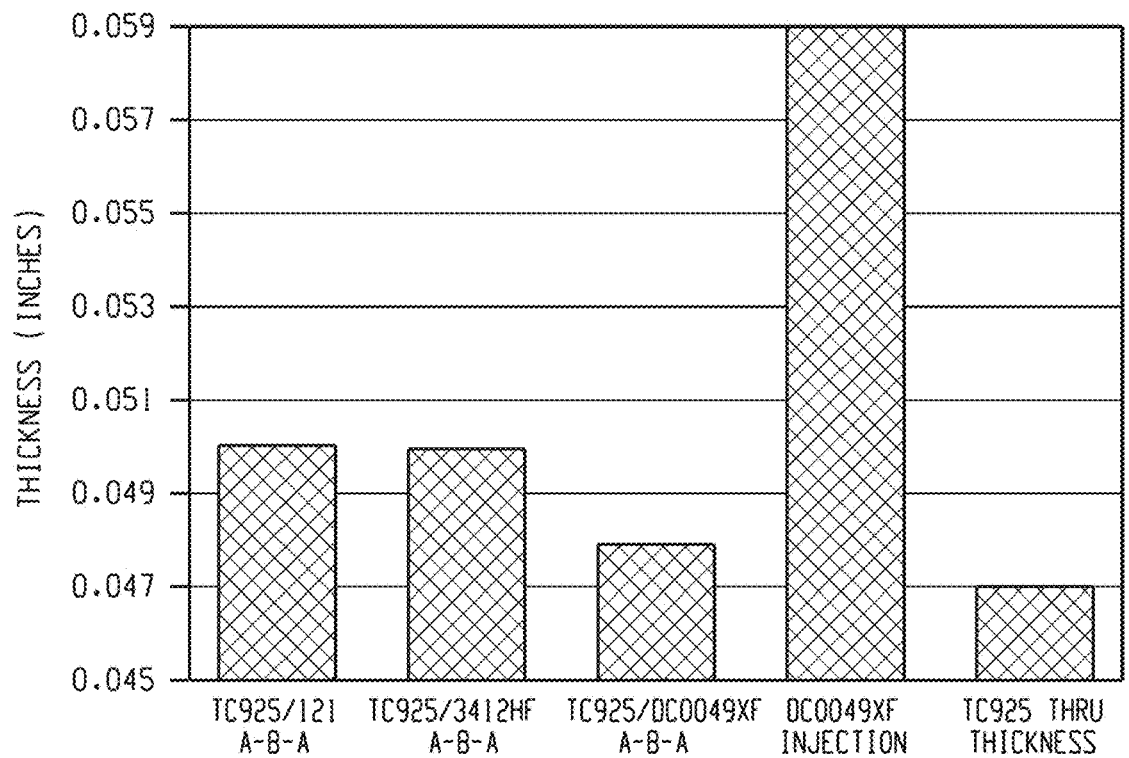
FIG. 7 is a chart illustrating the part thickness of a simulated part at a target stiffness.
Figure 8:
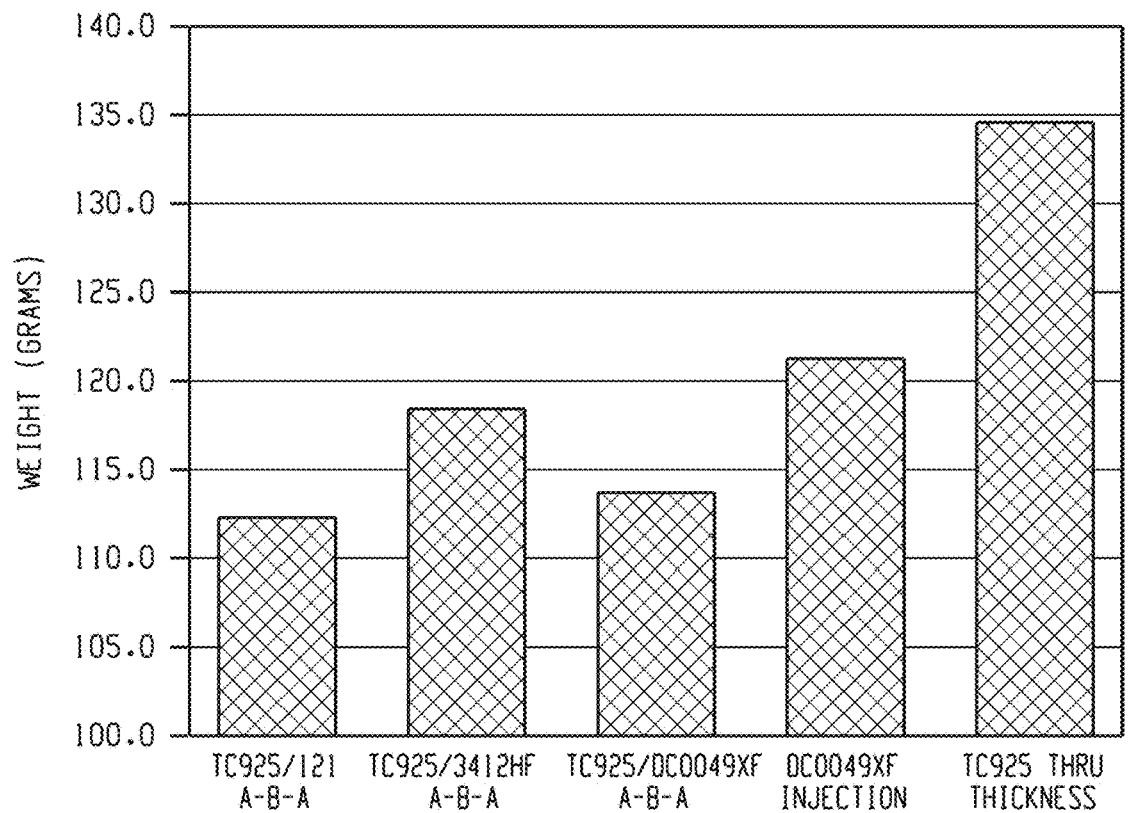
FIG. 8 is a chart illustrating the part weight of a simulated part at a target stiffness.
Figure 9:
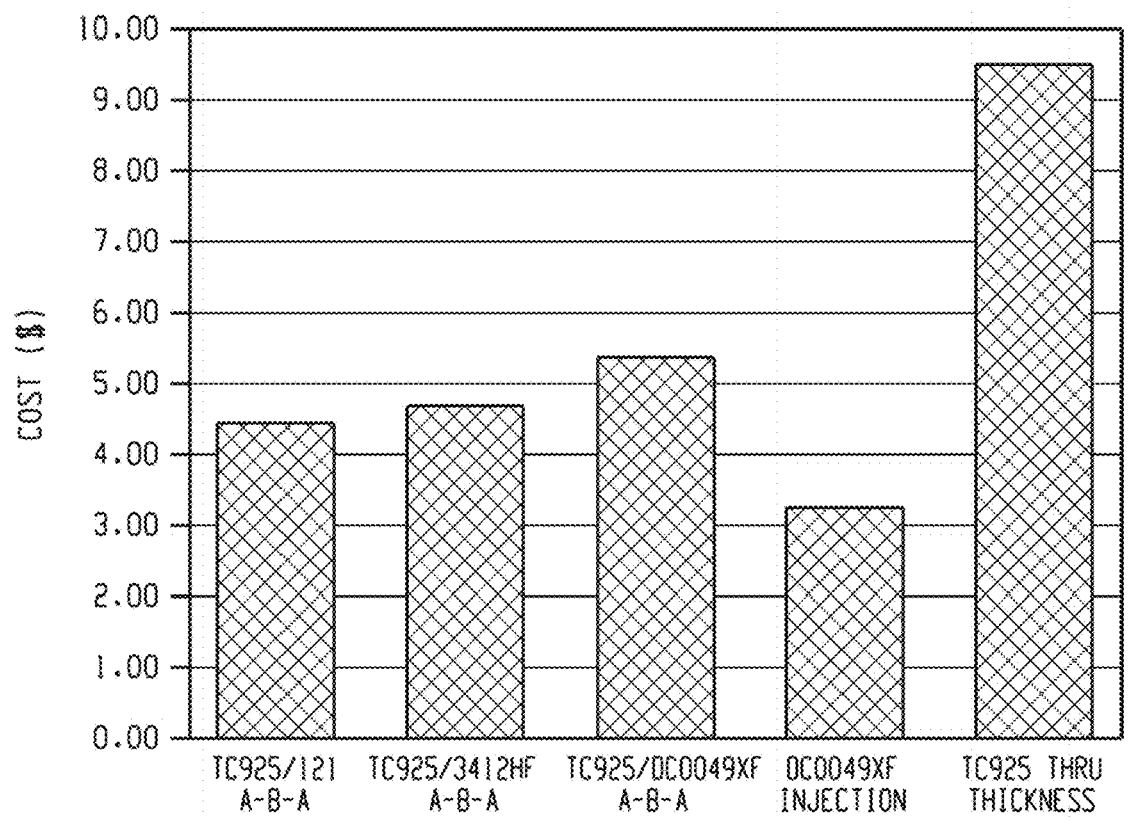
FIG. 9 is a chart illustrating the estimated cost of a simulated part at a target stiffness.

FIGS. 7-9 compare the performance of polycarbonate based sandwich constructions using 20% short carbon filled polycarbonate as a baseline. Various A-B-A sandwich constructions are compared on the basis of weight, stiffness and current costs. The "target" in this instance is a hypothetical 20% carbon reinforced PC based notebook housing with a wall thickness of 0.059 inches (in) (1.5 mm), weight of 0.267 pounds (lb) (121 grams (g)) and projected area of 95.4 square inches (in$^2$) (615.8 square centimeters (cm$^2$)). Flexural stiffness for the housing is 27.6 lb-in$^2$ (0.19 megaPascal (MPa)) All systems are compared at a flexural stiffness equivalent to this value. As used in FIGS. 7-9, "TC 925" refers to polycarbonate based 66 wt. % E-glass reinforced (7581 fabric) laminate having a thickness of 0.0094 in (0.24 mm) (e.g., Tencate Cetex TC 925 FST-7581 laminate). "121" refers to unreinforced polycarbonate (e.g., SABIC LEXAN™ 121). "3412HF" refers to a 20% short glass reinforced polycarbonate injection molding compound (e.g., SABIC LEXAN™ 3412 HF). "DC0049XF" refers to a 20% short carbon reinforced polycarbonate injection molding compound (e.g., SABIC Thermocomp™ DC0049XF). The A-B-A constructions include a single layer of TC925 laminate (A-layer) with a B-layers of 122, 3412HF, or DC0049XF.

As shown in FIGS. 7 and 8, the A-B-A constructions offer significant benefit in thickness and weight over the injection molded polycarbonate at the same flexural stiffness of 27.6 lb-in$^2$. As shown in FIG. 9, A-B-A constructions offer significant savings in terms of cost when compared to the TC 925 through thickness composite.

Figure 10:
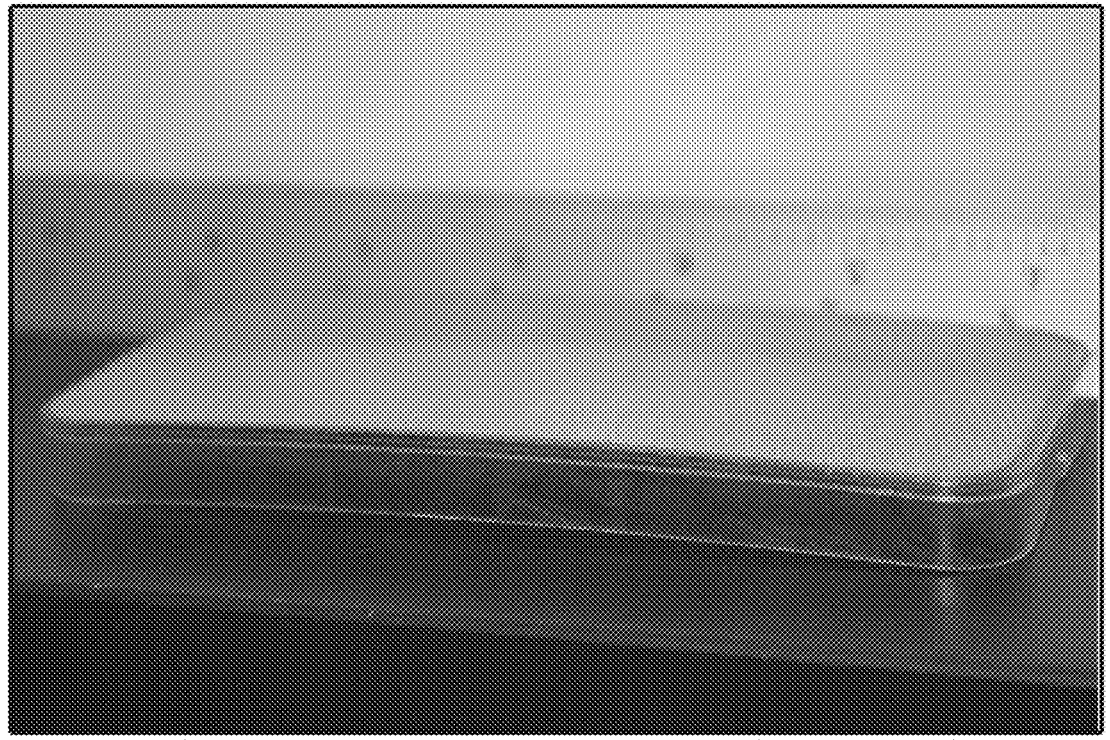
FIG. 10 is a photo of an embodiment of an A-B-A structure with a frame that can be used as a housing manufactured according to the method of FIG. 6.
Figure 11:
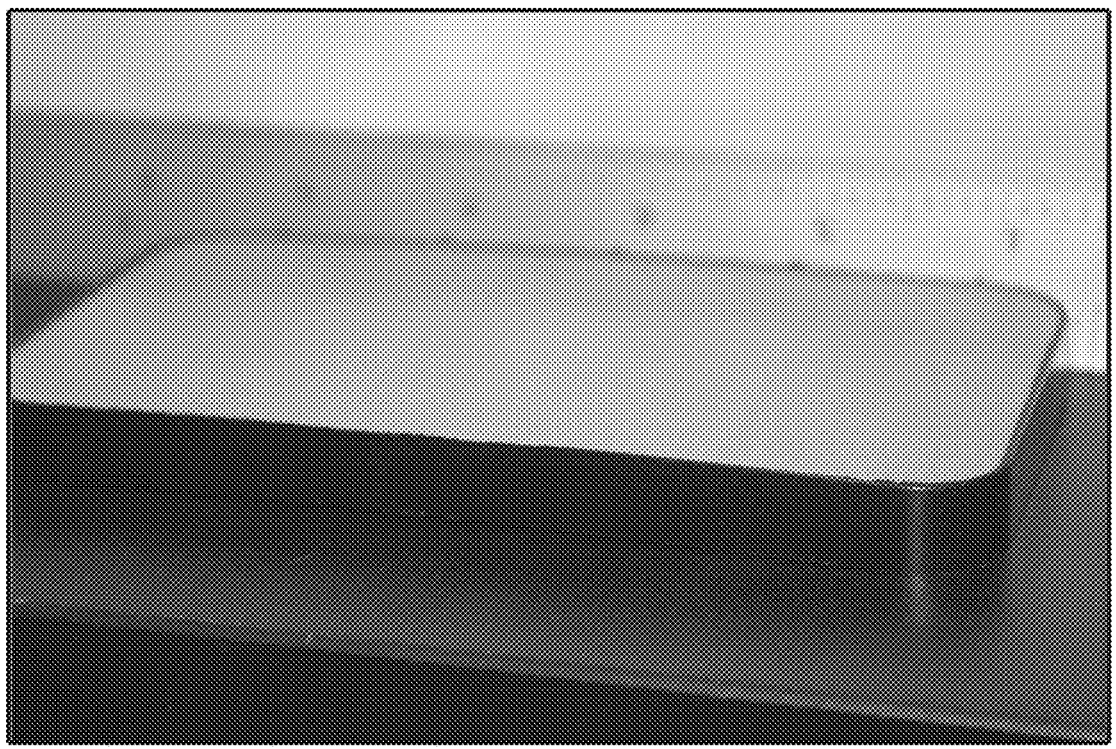
FIG. 11 is a photo of an embodiment of an A-B-A structure with a frame that can be used as a housing manufactured according to the method of FIG. 6.
Figure 12:
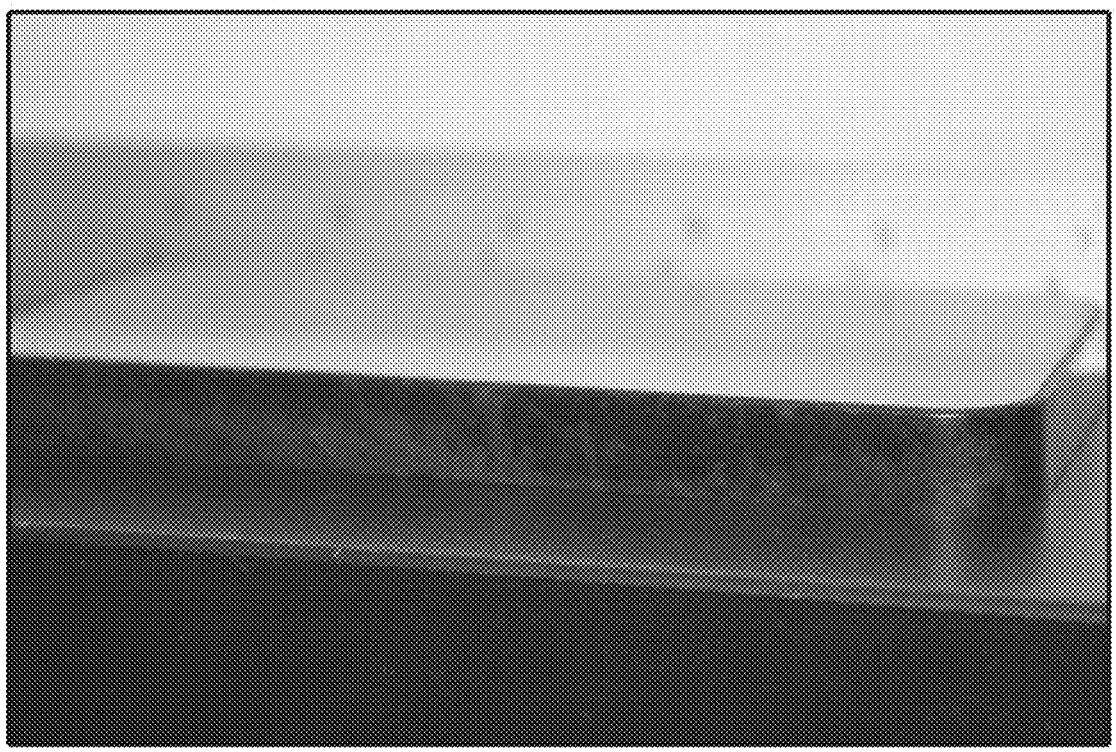
FIG. 12 is a photo of an embodiment of an A-B-A structure with a frame that can be used as a housing manufactured according to the method of FIG. 6.

FIGS. 10-12 illustrate examples of thin-wall composite housings that have been produced by overmolding a frame onto a A-B-A construction. The A-B-A construction of FIGS. 10-12 include E-glass reinforced polycarbonate cores, and the injection molded frame materials are unreinforced polycarbonate (FIG. 10), 10 wt % short glass reinforced polycarbonate (FIG. 11), and 20% short carbon fiber reinforced polycarbonate (FIG. 12) respectively. As shown in FIG. 10, the difference in the coefficient of thermal expansion between the frame material and the laminate material results in significant bowing. In contrast, the frame materials of FIGS. 11 and 12 have coefficients of thermal expansion that closely match the coefficient of thermal expansion of the A-B-A structure. Thus, the examples of FIGS. 11 and 12 illustrate that flat samples can be produced when the coefficients of thermal expansion for the frame material and the laminate material are closely matched.

Figure 13:
FIG. 13 is a photo of a top view of an embodiment of an A-B-A structure with a frame that can be used as a housing manufactured according to the method of FIG. 6.
Figure 14:
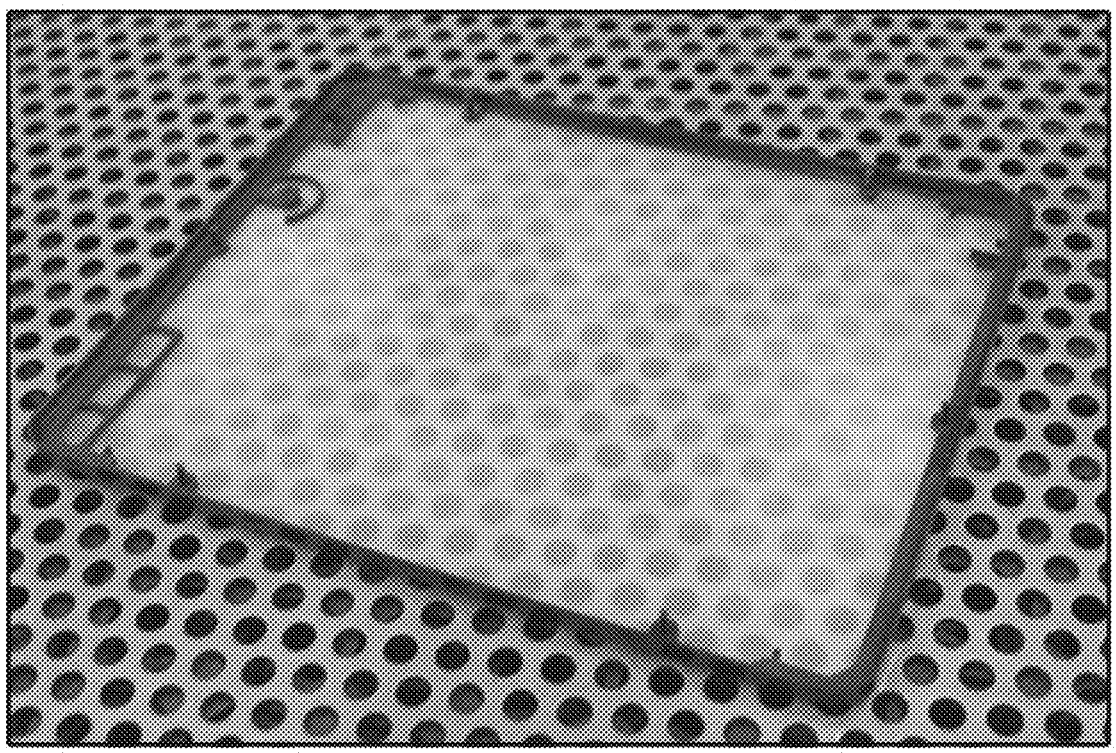
FIG. 14 is a photo of a bottom view of the tablet sized A-B-A structure of FIG. 13.

FIGS. 13 and 14 are photos of a tablet sized housing, e.g., for an electronic device, manufactured according to the method of FIG. 6. This housing demonstrates principles disclosed herein. In this example, the overmolded laminate can be a polycarbonate based construction with 66 wt. % E-glass outer layers and an unreinforced polycarbonate core. Total A-B-A structure thickness (t) is 1.00 mm with a core ("B") layer thickness ($t_c$) of 0.50 mm, hence $t_c/t$ is 0.50. The overmolding resin is also a polycarbonate based system. It is an E-glass short fiber filled compound with a coefficient of thermal expansion chosen to match the overall thermoelastic characteristics of the polycarbonate A-B-A structure. The result is a well-bonded and dimensionally stable part.

A-B-A constructions that utilize unreinforced cores as described in FIG. 1 are especially well suited for overmolding operations. Use of an unreinforced core lowers the effective CTE of the A-B-A laminate and allows the use of overmolding resins with lower filler levels. This is desirable because high filler loading levels in injection resins result in high viscosities and filling pressures. In addition, the extremely high filler levels that are required to match CTE and laminate shrinkage for through-thickness constructions exhibit lower impact performance. High filling pressures and low impact performance are undesirable characteristics for an overmolded frame.

Set forth below are some embodiments of housings and methods of making housings as disclosed herein.

Embodiment 1

An A-B-A structure, comprising: a core layer comprising a first thermoplastic material having a first density (Y), wherein the core layer has a core thickness and wherein the core layer comprise at least one of (i) a through plane thermal conductivity of greater than equal to 0.1 W/mK, and (ii) a core layer density (X) that is X≥0.8Y; a first outer layer comprising a second thermoplastic material located on a first side of the core layer; and a second outer layer comprising the second thermoplastic material located on a second side of the core layer opposite the first side; wherein the core thickness is 30% to 75% of a total thickness of the A-B-A structure.

Embodiment 2

The structure of Claim 1, wherein the total thickness is 0.5 mm to 1.5 mm, preferably 0.5 mm to 1.25 mm, or 0.75 mm to 1.1 mm.

Embodiment 3

The structure of any of the preceding Embodiments, wherein the core thickness is 30% to 75% of the total thickness, preferably 40% to 60% of the total thickness, or 45% to 55% of the total thickness, or 55% to 70% of the total thickness.

Embodiment 4

The structure of any the preceding Embodiments, wherein the first thermoplastic material comprises polypropylene, polyamide, polycarbonate, polyphenylene sulfide, polyetherimide, polyetheretherketone, and combinations comprising at least one of the foregoing; preferably, the first thermoplastic material can comprise polycarbonate, polyetherimide, polyphenylene oxide, and nylon, and combinations comprising at least one of the foregoing; or preferably, wherein the first thermoplastic material and the second thermoplastic material comprise polycarbonate.

Embodiment 5

The structure of any of the preceding Embodiments, wherein the core layer comprises 0 wt % reinforcing material.

Embodiment 6

The structure of any of Embodiments 1-4, wherein the core layer comprises 5 vol % to 35 vol % reinforcing material, based upon the total volume of the core layer; preferably 5 vol % to 30 vol % reinforcing material; or preferably 5 vol % to 25 vol % reinforcing material; or 10 vol % to 35 vol % reinforcing material.

Embodiment 7

The structure of any of Embodiments 1-10, wherein the first outer layer comprises greater than or equal to 35 vol. % reinforcing material based upon a total weight of the first outer layer, preferably 35 vol. % to 70 vol. % reinforcing material, or 40 vol. % to 60 vol. % reinforcing material; and wherein the second outer layer comprises greater than or equal to 35 vol. % reinforcing material based upon a total weight of the second outer layer, preferably 35 vol. % to 70 vol. % reinforcing material, or 40 vol. % to 60 vol. % reinforcing material.

Embodiment 8

The structure of Embodiment 7, wherein the reinforcing material is a fabric; preferably, wherein the reinforcing material is a patterned fabric Embodiment 9

The structure of Embodiment 8, wherein the reinforcing material is the patterned fabric and the patterned fabric comprises at least one of (i) a pattern that is not a uniformly repeated pattern; (ii) an open weave fabric; (iii) a fabric having a non-uniform density across the fabric; and (iv) a tailored pattern with fabric where needed in order to attain the strength and stiffness for the application of the article; preferably, wherein the reinforcing material is the patterned fabric and the patterned fabric comprises at least one of (i) a patter that is not a uniformly repeated pattern; and (ii) an open weave fabric; (iii) a fabric having a non-uniform density across the fabric.

Embodiment 10

The structure of Embodiment 8, wherein the reinforcing material is the patterned fabric and the patterned fabric comprises a patter that is not a uniformly repeated pattern.

Embodiment 11

The structure of Embodiment 8, wherein the reinforcing material is the patterned fabric and the patterned fabric comprises an open weave fabric.

Embodiment 12

The structure of Embodiment 8, wherein the reinforcing material is the patterned fabric and the patterned fabric comprises a fabric having a non-uniform density across the fabric.

Embodiment 13

The structure of any of Embodiments 6-12, wherein the reinforcing material comprises high stiffness inorganic fibers having a modulus of greater than or equal to 35 GPa; preferably having a modulus of greater than or equal to 45 GPa; preferably, the reinforcing material comprises glass, carbon, quartz, boron, and combinations comprising at least one of the foregoing.

Embodiment 14

The structure of any of the preceding Embodiments, wherein the core layer comprises a thermal conductivity of greater than or equal to 1 W/mK.

Embodiment 15

The structure of any of the preceding Embodiments, wherein the core layer density (X) is X≥0.8Y; preferably, wherein the core layer density (X) is X≥Y.

Embodiment 16

The structure of any of the preceding Embodiments, wherein the first thermoplastic material has a first melt flow rate and the second thermoplastic material has a second melt flow rate, and wherein the second melt flow rate is greater than or equal to 2× the first melt flow rate; preferably, wherein the second melt flow rate is greater than or equal to 3× the first melt flow rate.

Embodiment 17

The structure of any of the preceding Embodiments, wherein the first thermoplastic material has a first melt flow rate and the second thermoplastic material has a second melt flow rate; wherein the second melt flow rate is greater than or equal to 25 g/10 min; preferably, the second melt flow rate is greater than or equal to 45 g/10 min, or the second melt flow rate is greater than or equal to 50 g/10 min; and wherein the first melt flow rate is less than or equal to 10 g/10 min.

Embodiment 18

The structure of any of the preceding Embodiments, wherein when resting on a flat surface, the structure comprises separation from the flat surface of less than or equal to 2 mm, preferably less than or equal to 1 mm, or less than or equal to 0.2 mm, or no separation measurable without a microscope.

Embodiment 19

The structure of any the preceding Embodiments, wherein the second thermoplastic material and the second thermoplastic material comprises polypropylene, polyamide, polycarbonate, polyphenylene sulfide, polyetherimide, polyetheretherketone, and combinations comprising at least one of the foregoing; preferably, the second thermoplastic material can comprise polycarbonate, polyetherimide, polyphenylene oxide, and nylon, and combinations comprising at least one of the foregoing; or preferably, wherein the second thermoplastic material and the second thermoplastic material comprise polycarbonate

Embodiment 20

The structure of any the preceding Embodiments, wherein the core layer is neat, or wherein the core layer comprises short fibers, preferably short glass fibers.

Embodiment 21

The structure of any the preceding Embodiments, wherein the first outer layer and the second outer layer comprise a glass-carbon hybrid fabric, preferably, wherein the first outer layer and the second outer layer comprise an E-glass-carbon hybrid fabric.

A method for making the A-B-A structure of any of the preceding Embodiments, comprising: locating the first outer layer on a first side of an injection mold; locating the second outer layer on a second side of an injection mold; closing the mold; forming the core layer by injecting the first thermoplastic material between the first outer layer and the second outer layer to form the A-B-A structure; opening the mold and removing the A-B-A structure.

Embodiment 21

A method for forming a housing comprising the A-B-A structure of any of the preceding Embodiments, comprising forming a frame around the A-B-A structure.

Embodiment 22

The method of Embodiment 20, wherein the frame comprise a material that is compatible with the A-B-A structure such that the A-B-A structure is initially flat before the frame is formed around the A-B-A structure and has a final shape after the A-B-A structure is formed that when measured on a flat surface has a separation from the flat surface of less than or equal to 2 mm, preferably less than or equal to 1 mm, or less than or equal to 0.2 mm, or no separation that measurable without a microscope.

Embodiment 23

The method of any of Embodiments 21-22, wherein the frame comprises the first thermoplastic material.

Embodiment 24

The method of any of embodiments 21-23, wherein forming the frame comprises injecting a thermoplastic material around the A-B-A structure; or wherein forming the frame comprises forming the frame from the first thermoplastic material when the first thermoplastic material is injected between the first outer layer and the second outer layer.

Embodiment 25

The method of any of Embodiments 21-24, further comprising forming ribs and attachment features attached to the frame.

Embodiment 26

An electronic device comprising: the housing of any of any of Embodiments 21-25 further comprising a backing; and electronic components located between the A-B-A structure and the backing.

The invention may alternately include, consist of, or consist essentially of, any appropriate components herein disclosed. The invention may additionally, or alternatively, be formulated so as to be devoid, or substantially free, of any components, materials, ingredients, adjuvants or species used in the prior art materials or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic)

described in connection with the embodiment is included in at least one embodiment described herein, and may or may not be present in other embodiments. In addition, it is to be understood that the described elements may be combined in any suitable manner in the various embodiments. As used herein, peel strength is determined in accordance with ASTM D1781 (1994): standard test method for climbing drum peel for adhesives. Unless specifically specified otherwise, the test standards set forth herein are the most recent version as of Jul. 9, 2014.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A housing for an electronic device comprising:
   a solid core layer comprising a first thermoplastic material;
   a first skin layer comprising a second thermoplastic material located on a first side of the core layer;
   a second skin layer comprising the second thermoplastic material located on a second side of the core layer opposite the first side;
   wherein the core layer has a through plane thermal conductivity of greater than equal to 0.1 W/mK;
   wherein the thickness of the core layer is 30% to 75% of the total thickness of the housing, and wherein at least one of the following
   the core layer comprises 0 vol % to 35 vol % of a reinforcing material and 100 vol % to 65 vol % of the first thermoplastic material, based upon the total volume of the core layer; and
   the first skin layer has a different viscosity, different molecular weight, different reinforcement loading, or combinations thereof, as compared to the second skin layer.

2. The housing of claim 1, wherein the total thickness of the housing is 0.5 mm to 1.5 mm.

3. The housing of claim 1, wherein the thickness of the core layer is 55% to 70% of the total thickness of the housing.

4. The housing of claim 1, wherein the first thermoplastic material comprises polycarbonate.

5. The housing of claim 1, wherein first thermoplastic material comprises 20% to 50% by weight glass fiber or wherein first thermoplastic material comprises 10% to 30% by weight short carbon filler.

6. The housing of claim 1, wherein the second thermoplastic material comprises inorganic fabric reinforced thermoplastic material.

7. The housing of claim 1, wherein the second thermoplastic material comprises inorganic fabric reinforced polypropylene, polyamide, polycarbonate, polyphenylene sulfide, polyetherimide, polyetheretherketone, and the like.

8. The housing of claim 1, wherein the coefficient of thermal expansion of the core layer differs from the coefficient of expansion of the frame by less than 20%.

9. The housing of claim 1, wherein the core layer comprises a thermal conductivity of greater than or equal to 1 W/mK.

10. The housing of claim 1, further comprising a frame connected to at least a portion of the core layer.

11. The housing of claim 10, wherein the coefficient of thermal expansion of the core layer differs from the coefficient of expansion of the frame by less than 10%.

12. A housing for an electronic device comprising:
    a solid core layer comprising a first thermoplastic material;
    a first skin layer comprising a second thermoplastic material located on a first side of the core layer;
    a second skin layer comprising the second thermoplastic material located on a second side of the core layer opposite the first side;
    wherein the core layer has a density that is less than or equal to the second thermoplastic material and greater than or equal to the density of the first thermoplastic material;
    wherein the thickness of the core layer is 30% to 75% of the total thickness of the housing, and wherein at least one of the following
    the core layer comprises 0 vol % to 35 vol % of a reinforcing material and 100 vol % to 65 vol % of the first thermoplastic material, based upon the total volume of the core layer; and
    the first skin layer has a different viscosity, different molecular weight, different reinforcement loading, or combinations thereof, as compared to the second skin layer.

13. A method for making an electronic device housing comprising:
    locating a first skin layer on a first side of an injection mold;
    locating a second skin layer on a second side of an injection mold;
    closing the mold;
    injecting a first thermoplastic material between the first skin layer and the second skin layer to form a core layer;
    opening the mold and removing a housing comprising the first skin layer, core layer, and second skin layer;
    wherein the core layer has a through plane thermal conductivity of greater than equal to 0.1 W/mK;
    wherein the thickness of the core layer is 30% to 75% of the total thickness of the housing, and wherein at least one of the following
    the core layer comprises 0 vol % to 35 vol % of a reinforcing material and 100 vol % to 65 vol % of the first thermoplastic material, based upon the total volume of the core layer; and
    the first skin layer has a different viscosity, different molecular weight, different reinforcement loading, or combinations thereof, as compared to the second skin layer.

14. The method of claim 13, wherein the core further comprises a frame extending beyond the first skin layer and second skin layer, wherein the frame comprises the first thermoplastic material.

15. The method of claim 13, wherein first skin layer and the second skin layer comprise a second thermoplastic material.

16. The method of claim 13, wherein the total thickness of the housing is 0.5 mm to 1.5 mm.

17. The method of claim 13, comprising:
locating the housing in an injection mold;
   wherein the core layer has a through plane thermal conductivity of greater than equal to 0.1 W/mK;
   wherein the thickness of the core layer is 30% to 75% of the total thickness of the housing;
closing the mold;
injecting a thermoplastic material around the housing to form a frame attached to the housing;
opening the mold and removing the framed housing.

18. The method of claim 17, wherein the total thickness of the housing is 0.5 mm to 1.5 mm.

19. The method of claim 17, wherein the thickness of the core layer is 55% to 70% of the total thickness of the housing.

20. The method of claim 17, wherein the first thermoplastic material comprises polycarbonate; and wherein first thermoplastic material comprises 20% to 50% by weight glass fiber and/or 10% to 30% by weight short carbon filler.

* * * * *